Patented Nov. 26, 1935

2,022,446

UNITED STATES PATENT OFFICE 2,022,446

PROCESS OF PREPARING ORGANIC CELLULOSE ESTERS

Wilhelm Walter, Cologne-Niehl, and Rudolf Hofmann, Dormagen, Germany, assignors to I. G. Farbenindustrie Aktiengesellschaft, Frankfort-on-the-Main, Germany No Drawing. Application July 10, 1931, Serial No. 550,046. In Germany July 16, 1930

11 Claims. (Cl. 260—102)

The present invention relates to a process of preparing organic cellulose esters.

The manufacture of cellulose esters of fatty acids is carried out in general by means of the anhydride of the fatty acid to be introduced into the cellulose molecule with the aid of an acylation catalyst, especially sulfuric acid, acid sulfuric acid salts or other suitable derivatives of sulfuric acid, and with the addition of a solvent for the cellulose ester formed, favorably the free fatty acid or a suitable halogenated aliphatic hydrocarbon, or a mixture of the free fatty acid and halogenated aliphatic hydrocarbon.

The sulfuric acid catalysts possess not only the ability to accelerate the acylation, but also possess the property of taking part chemically in the reaction so that sulfuric acid groups enter into the cellulose molecule simultaneously with fatty acid groups. In consequence of the strong catalytic action of sulfuric acid and derivatives thereof it also becomes possible to effect the reaction with relatively small quantities of catalyst.

When, for example, an acetylation is carried out with a small quantity of sulfuric acid (for example, a few per cent of $H_2SO_4$, calculated on the cellulose used) products are obtained, which in consequence of their solubility properties are regarded as "triacetates", although they still contain combined sulfuric acid depending on the quantity of the catalyst employed. The resulting products are subjected to hydrolysis in order to convert the same to the technically valuable degree of acetone solubility, whereby a partial splitting off of acetyl groups as well as also of sulfuric acid groups from the cellulose acetate takes place. By means of the described method of working products are obtained, which still contain about 0.1–0.3% of combined sulfuric acid and which consequently, after isolation from the crude solution, do not yet possess sufficient stability at high temperatures.

For this reason cellulose esters, when isolated in the customary manner, must still be subjected to a special stabilizing process. The customary stabilizing process which aims at a splitting off sulfuric acid radicals from the isolated product necessitates the setting up of a special apparatus, requires a relatively high steam and power consumption and in consequence increases to a considerable extent the manufacturing costs of the ultimate product. Moreover, the risk is incurred that acyl groups may be split off from the cellulose ester with the result that the product may undergo an undesirable change in its chemical and physical properties.

In accordance with the present invention the stabilizing of cellulose esters, for example cellulose acetate, is effected and the difficulties associated therewith are avoided by subjecting the crude solution itself to a special treatment. The process of the invention comprises neutralizing the sulfuric acid catalyst present in the crude solution by adding to the reaction mixture a neutralizing agent, such as sodium acetate, soda or caustic soda, in an amount at least corresponding to the sulfuric acid present, and then heating the reaction mass at an elevated temperature, for example, at 60–100° C. for several hours, say 1 to 3 hours. It is advantageous before heating the crude solution to incorporate water therein to such an extent that the fatty acid, such as acetic acid, contained in the reaction mass shows a concentration of about 50–80% on the water present. By means of this precaution any harmful effect on the cellulose acetate in regard to the chemical and physical properties thereof is avoided with certainty.

By means of the described method of working the sulfuric acid groups present in the cellulose ester are split off readily with the result that, after isolation of the ester, a completely stable product is obtained of a sulfuric acid content of less than 0.10%.

The isolation is effected in the known manner, for example by precipitation with water at ordinary or elevated temperatures.

The following examples illustrate the invention, without limiting it thereto:—

*Example 1.*—A crude acetylation solution obtained using a catalyst consisting of sulfuric acid and sodium bisulfate, and containing:

| | Parts by weight |
|---|---|
| Cellulose acetate of 55% $CH_3COOH$ content | 150 |
| Glacial acetic acid | 1000 |
| Water | 150 |
| Concentrated sulfuric acid (specific weight=1.84) | 16 |
| and | |
| Sodium acetate | 4.5 | is mixed with a slight excess of sodium acetate (=22.5 parts by weight) for the purpose of neutralizing the free mineral acid. Then 500 parts of water are incorporated with good stirring of the reaction mass, whereby the acetic acid present is brought to a concentration of about 60%. The temperature is now maintained at about 70–80° C. during 1–2 hours, and thereafter the cellulose acetate is isolated by precipitation with water at the same temperature. In this manner a completely stable cellulose acetate is obtained, while a test portion removed before the described treatment does not comply with the technical requirements.

|  | Percent $H_2SO_4$ | Decomposition point |
|---|---|---|
| Cellulose acetate, untreated | 0.25 | 215° C. |
| Cellulose acetate, after treatment | 0.08 | 260° C. |

*Example 2.*—A crude acetylation solution obtained according to the process described in British Patent 337,366 and consisting of:—

| | Parts by weight |
|---|---|
| Cellulose acetate of 55% $CH_3COOH$ content | 150 |
| Glacial acetic acid | 250 |
| Water | 45 |
| Ethylene chloride | 400 |
| Concentrated sulfuric acid (specific weight 1.84) | 0.6 |
| Hydrochloric acid (100%) | 1.0 | is mixed with 3.3 parts by weight of sodium acetate for the purpose of neutralizing the free mineral acid. 250 parts of water are then incorporated and the reaction mass maintained with stirring at about 80° C. during 1–2 hours. This operation can with advantage be carried out simultaneously with the recovery of the ethylene chloride.

Thereupon the cellulose acetate is isolated by precipitation with water of a temperature of about 90° C.

The final product is completely stable and contains 0.04% $H_2SO_4$, while the untreated product is not stable on heating and still contains over 0.1% $H_2SO_4$.

The invention is not restricted by the foregoing examples, which concern the acetylation of cellulose. In an analogous manner stable esters of the higher fatty acids, such as cellulose propionates, butyrates and the like and also stable mixed esters of cellulose with different fatty acids and other organic acids can likewise be produced.

We claim:—

1. In the process of preparing stable organic acid esters of cellulose the steps which comprise neutralizing the sulfuric acid catalyst present in a crude cellulose ester solution obtained by esterifying cellulose with an aliphatic acid anhydride in the presence of a sulfuric acid catalyst and with the addition of a solvent for the cellulose ester formed, adding water in such a quantity that the aliphatic acid present is diluted to an aqueous solution of from about 50 to about 80 per cent strength and heating the reaction mass at a temperature between about 60 and 100° C. for about 1 to 3 hours.

2. In the process of preparing stable acetyl cellulose the steps which comprise neutralizing the sulfuric acid catalyst present in a crude cellulose acetate solution obtained by esterifying cellulose with acetic anhydride in the presence of sulfuric acid as catalyst and with the addition of a solvent for the cellulose acetate formed, adding water in such a quantity that the acetic acid present is diluted to an aqueous solution of from about 50 to about 80 per cent strength and heating the reaction mass at a temperature between 60–100° C. for about 1 to 3 hours.

3. In the process of preparing stable acetyl cellulose the steps which comprise neutralizing the sulfuric acid catalyst present in a crude cellulose acetate solution obtained by esterifying cellulose with acetic anhydride in the presence of sulfuric acid as catalyst and with the addition of acetic acid as solvent for the cellulose acetate formed, adding water in such a quantity that the acetic acid present is diluted to an aqueous solution of from about 50 to about 80 per cent strength and heating the reaction mass at a temperature between 60–100° C. for about 1 to 3 hours.

4. In the process of preparing stable acetyl cellulose the steps which comprise neutralizing the sulfuric acid catalyst present in a crude cellulose acetate solution obtained by esterifying cellulose with acetic anhydride in the presence of sulfuric acid as catalyst and with the addition of a chlorinated aliphatic hydrocarbon as solvent for the cellulose acetate formed, adding water in such a quantity that the acetic acid present is diluted to an aqueous solution of from about 50 to about 80 per cent strength and heating the reaction mass at a temperature between 60–100° C. for about 1 to 3 hours.

5. In the process of preparing stable acetyl cellulose the steps which comprise neutralizing the sulfuric acid catalyst present in a crude cellulose acetate solution obtained by esterifying cellulose with acetic anhydride in the presence of sulfuric acid as catalyst and with the addition of ethylene chloride as solvent for the cellulose acetate formed, adding water in such a quantity that the acetic acid present is diluted to an aqueous solution of from about 50 to about 80 per cent strength and heating the reaction mass at a temperature between 60–100° C. for about 1 to 3 hours.

6. In the process of preparing stable acetyl cellulose the steps which comprise neutralizing the sulfuric acid catalyst present in a crude cellulose acetate solution obtained by esterifying cellulose with acetic anhydride in the presence of sulfuric acid as catalyst and with the addition of a mixture of acetic acid and a chlorinated aliphatic hydrocarbon as solvent for the cellulose acetate formed, adding water in such a quantity that the acetic acid is diluted to an aqueous solution of from about 50 to about 80 per cent strength, and heating the reaction mass at a temperature between 60–100° C. for about 1 to 3 hours.

7. In the process of preparing stable acetyl cellulose the steps which comprise neutralizing the sulfuric acid catalyst present in a crude cellulose acetate solution obtained by esterifying cellulose with acetic anhydride in the presence of sulfuric acid as catalyst and with the addition of mixture of acetic acid and ethylene chloride as solvent for the cellulose acetate formed, adding water in such a quantity that the acetic acid is diluted to an aqueous solution of from about 50 to about 80 percent strength, and heating the reaction mass at a temperature between 60–100° C. for about 1 to 3 hours.

8. In the process of preparing stable acetyl cellulose the steps which comprise neutralizing by the addition of sodium acetate the sulfuric acid catalyst present in a crude cellulose acetate solution obtained by esterifying cellulose with acetic anhydride in the presence of sulfuric acid as catalyst and with the addition of acetic acid as solvent for the cellulose acetate formed, adding water in such a quantity that the acetic acid is diluted to an aqueous solution of from about 50 to about 80 percent strength, and heating the reaction mass at a temperature between 60–100° C. for about 1 to 3 hours.

9. In the process of preparing stable acetyl cellulose the steps which comprise neutralizing by the addition of sodium acetate the sulfuric acid catalyst present in a crude cellulose acetate solution obtained by esterifying cellulose with acetic anhydride in the presence of sulfuric acid as catalyst and with the addition of a mixture of acetic acid and a chlorinated aliphatic hydrocarbon as solvent for the cellulose acetate formed, adding water in such a quantity that the acetic acid is diluted to an aqueous solution of from about 50 to about 80 per cent strength, and heating the reaction mass at a temperature between 60–100° C. for about 1 to 3 hours.

10. In the process of preparing stable acetyl cellulose the steps which comprise neutralizing by the addition of sodium acetate the sulfuric acid catalyst present in a crude cellulose acetate solution obtained by esterifying cellulose with acetic anhydride in the presence of sulfuric acid as catalyst and with the addition of a mixture of acetic acid and ethylene chloride as solvent for the cellulose acetate formed, adding water in such a quantity that the acetic acid is diluted to an aqueous solution of from about 50 to about 80 per cent strength, and heating the reaction mass at a temperature between 60–100° C. for about 1 to 3 hours.

11. In the process of preparing stable organic acid esters of cellulose, the steps which comprise neutralizing the sulfuric acid catalyst present in a crude cellulose ester solution obtained by esterifying cellulose with an aliphatic acid anhydride in the presence of a sulfuric acid catalyst, adding water in such a quantity that the aliphatic acid present is diluted to an aqueous solution of from about 50 to about 80% strength and heating the reaction mass at a temperature between about 60 and about 100° C. for several hours until the sulphuric acid content of the cellulose ester is less than 0.10%.

WILHELM WALTER.
RUDOLF HOFMANN.